CATHODE RAY TUBE TIME-BASE CIRCUIT

Filed July 30, 1947 2 SHEETS—SHEET 1

GARFIELD L. HINCKLEY
JOHN H. W. SIMMONS
Inventors
By Cushman, Darby & Cushman
Attorneys

CONDENSERS

| | | |
|---|---|---|
| C34 | ·1 μF | 350 V. WKG. |
| C35 | ·1 μF | 350 V. .. |
| C36 | ·1 μF | 350 V. .. |
| C37 | ·01 μF | 350 V. .. |
| C38 | ·1 μF | 350 V. .. |
| C39 | ·002 μF | 350 V. .. |
| C40 | ·001 μF | 350 V. .. |
| C41 | ·1 μF | 350 V. .. |
| C42 | ·05 μF | 2K V. .. |
| C43 | ·001 μF | 350 V. .. |
| C60 | ·001 μF | 350 V. .. |

RESISTANCES

| | | |
|---|---|---|
| R46 | 1K | POT. |
| R47 | 4·7K | 1/2 W |
| R48 | 220 Ω | 1/2 W |
| R49 | 100 Ω | 1/2 W |
| R50 | 10K | 2 W |
| R51 | 47K | 1 W |
| R52 | 68K | 1/2 W |
| R53 | 250K | POT. |
| R54 | 2·2 M | 1/2 W |
| R55 | 1 M | POT. |
| R56 | 68K | 1/2 W |
| R57 | 47K | 1/2 W |
| R58 | 22K | 3W |
| R59 | 22K | 2W |
| R61 | 68K | 2W |
| R62 | 1M | 1/2 W |
| R63 | 100K | 1/2 W |
| R64 | 2·2M | 1/2 W |
| R65 | 1K | 1/2 W |
| R66 | 680 Ω | 1/2 W |
| R67 | 20K | POT. |
| R68 | 15K | 2W |
| R69 | 220 Ω | 1/2 W |
| R70 | 68K | 1 W |

VALVES

| | |
|---|---|
| V10 | MU/EF50 |
| V11 | MU/EB34 |
| V12 | MU/EF50 |
| V13 | MU/EF50 |
| V14 | MU/EF50 |
| V15 | MU/EF50 |

Fig. 2.

Garfield L. Hinckley
John H. W. Simmons
*Inventors*

By Cushman Darby & Cushman
*Attorneys*

Patented Nov. 6, 1951 2,573,970

UNITED STATES PATENT OFFICE 2,573,970

CATHODE-RAY TUBE TIME-BASE CIRCUIT

Garfield Louis Hinckley, Fleet, and John Harry Walrond Simmons, Rushwick, England, assignors to Minister of Supply, in His Majesty's Government of the United Kingdom of Great Britain and Northern Ireland, London, England Application July 30, 1947, Serial No. 764,844
In Great Britain February 19, 1946

Section 1, Public Law 690, August 8, 1946
Patent expires February 19, 1966

12 Claims. (Cl. 250—27)

Figure 1:
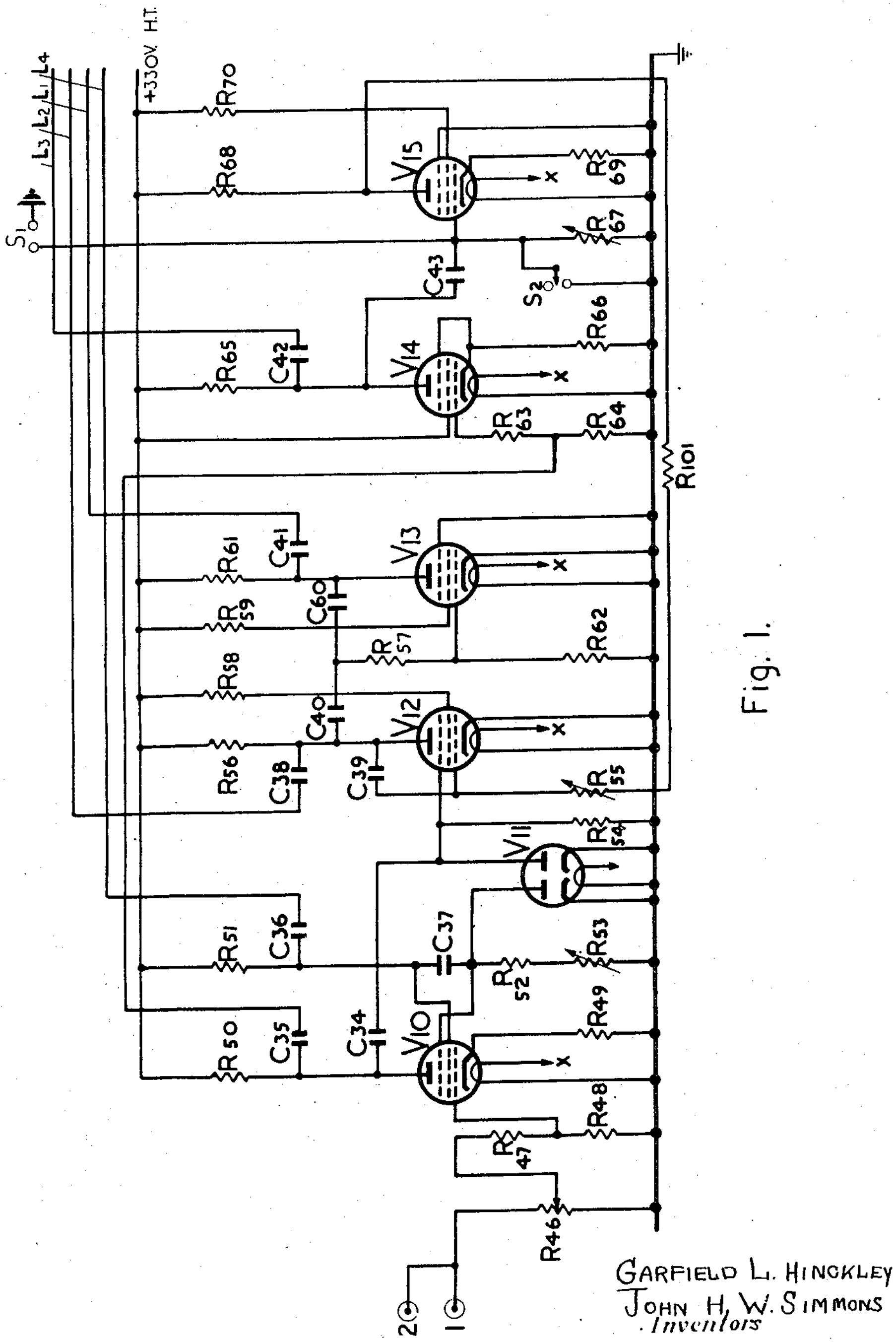

This invention relates to circuits used in the production of time-base traces for a cathode ray tube and is concerned more especially with circuits intended to produce a split time-base, i. e. two separated traces suitable for use in respect of separately applied signals or intelligence.

The invention is more particularly directed to apparatus in which two separate sources of impulses, e. g. two radio aerial systems, are alternatively connected to the cathode ray tube by switch means and it is desired that each time-base trace shall give indications of impulses from one of said sources, so, for example, that the results may be visually compared. It will be apparent that some difficulty may arise when there is no fixed relationship between the rate of switching between the two sources and the pulse recurrence frequency of the time-base trace which is to be split. The present invention aims at overcoming this difficulty and to that end arranges that the time-base shall be "split" at and only at, the commencement of the trace, irrespective of the fact that the switch means may change over the connection from one source of impulses to the other at any time during the interval between successive pulses originating successive traces.

According to the invention there is provided a time base circuit for a cathode ray tube or other oscilloscope, including a linear time base thermionic generator whereof the operating level of the control electrode is adjustable over a switch actuated potentiometer.

In practical embodiments the thermionic generator operates as a Miller circuit producing a saw tooth output and has its control grid connected to the switch actuated potentiometer so that the positive potential to which the grid may be returned may be varied as may be necessary to give the required "splitting" of the time base at the appropriate time, the object of the invention being achieved by arranging that the potentiometer is controlled by the generator so as to ensure that the time base is "split" at the commencement of the trace irrespective of when switching of the potentiometer occurs.

The potentiometer may conveniently include a thermionic valve arranged to operate as a resistance or as a cut-out device, according to the position of the potentiometer control switch and thereby to vary the positive potential to which the control grid of the generator is returned. The switch may, for example, be associated with or driven from switch means alternately coupling the cathode ray tube to different aerials or other sources of impulses.

In order that the invention may be readily understood and carried into effect reference will now be made to the following description and the accompanying drawings in which:

Figure 1 shows the pertinent part of a cathode ray tube control, including a practical embodiment of the time base circuit according to the invention and, Figure 2 shows a table of values of components used in the circuit shown in Figure 1; it being understood that these values are typical only and applicable to a particular set of design conditions variation of which would require adjustment to correspond without necessarily altering the general layout of the circuit shown.

The invention may be carried into effect in one convenient manner when applied to radio pulse-receiving equipment wherein the receiver is alternately coupled through appropriate continuously-driven switch means to the upper and lower lobes of an aerial array and displays separate indications, e. g. on a cathode ray tube, corresponding to the radiation received on the different aerial lobes. The time base trace in such apparatus may, in accordance with the invention, be effected by a Miller time base circuit which in its simplest form may comprise a pentode thermionic valve V12 circuit having capacity coupling C39 between anode and control grid.

The operation of this valve is controlled by a pulse, generated by an associated valve V10, acting through condenser C34 upon the suppressor grid of the Miller valve V12. This pulse, which is conveniently of square wave form, may be fed to a differentiating circuit, comprising a condenser C43 and variable resistance R67 in series to earth, the sharp differential pulses being fed from the junction of the condenser and variable resistance to the control grid of a potentiometer valve, e. g. a pentode V15 forming part of the control-grid circuit of the Miller valve. This pentode V15 has its cathode connected to earth and its anode connected through a suitable resistance load to the H. T. supply, while its anode output is fed, through a suitable resistance R101 if necessary, to the control grid of the Miller valve V12.

Between the control grid of the pentode V15 and earth is connected an on-off shorting switch S1 conveniently driven continuously from, or in synchronism with, the aerial switch. When this switch is closed the grid is earthed and the potentiometer valve conducts and acts merely as a resistance, forming a potentiometer with its anode load resistance. Its anode potential thus remains constant. When, on the other hand, the switch S1 is open, the valve functions and the negative differential of the applied square pulse cuts it off for a short period at the commencement of the time base. Thus the anode potential (and thus the potential to which the grid of the Miller valve is returned) becomes more positive than when the potentiometer valve is conducting and in consequene the time base is greatly accelerated at the early part of its trace. This acceleration has the result of shifting the whole time base in relation to the trace which is set-up when the shorting switch S1 is closed and as a result two traces (i. e. a "split" time base), is or are obtained. The length of time during which the negative differential of the applied pulse cuts off the pentode V15 (and thus the amount of separation of the two traces) depends upon the characteristics of the differentiating circuit and may be varied to suit requirements by adjustment of the variable resistance R67 therein.

It should be understood that the invention is not limited to the use of a pentode potentiometer valve in the manner described.

The preceding description serves merely to indicate the general principles of operation of a time base circuit which gives a "split" trace in accordance with the invention. A practical embodiment of a successful arrangement is described in the following detailed description of the circuit shown in Figure 1 of the accompanying drawing.

This split time base circuit forms part of a display unit designed to operate from radar R. F. equipment providing a 45 mc./s. I. F. output of approximately 150 micro volts R. M. S. noise level and positive synchroniser having a repetition of 300 to 900 pulses per second and 30 to 100 volts amplitude. A cathode ray tube indicator is included in the unit and the arrangement shown provides for ("splitting," i. e. shifting the point of commencement of the main time base trace applied over leads L1 and L2 to the X or Y plates of the cathode ray tube so that height finding by the echo amplitude comparison method is possible.

*Time base section.*—The time base section consisting of the valves V10, V11, V12, V13 and V14 generates a symmetrical linear time base, adjustable over a range of 30 to 120 miles, for applying to the cathode ray tube over leads L1 and L2. The operation of this circuit, in its general principles, is conventional, but is explained briefly to facilitate a complete understanding of the method of "splitting" the time base in accordance with the invention.

Synchronising (sync.) pulses from the radar R. F. equipment are fed in via plug No. 1. These pulses should be positive and of amplitude between 20 and 100 volts and pulse repetition frequency of 300/900 c. p. s. The timebase is triggered from the leading edge of the sync. pulse. A preset control R46 determines the amplitude of the pulse applied to the control grid of pentode valve V10, which valve is connected as a "Transitron" generating a positive square wave at the anode. The duration of this voltage is controlled by resistance R53 which, therefore, acts as the timebase range control. One half of the diode V11 prevents the suppressor grid of V10 going positive with respect to earth.

The positive square wave from the valve V10 is A. C. coupled over condenser C34 and D. C. restored by the other half of diode V11 to the suppressor grid of pentode valve V12. The valve V12 has its anode connected to control grid over condenser C39 as a Miller timebase generator, producing a negative going linear sawtooth voltage at its anode. The amplitude of this voltage is controlled by resistance R55 in the grid circuit of V12, the level of the positive potential of which is controllable in the manner to be described.

The valve V13 is a paraphase amplifier producing a positive going sawtooth voltage at its anode. The positive and negative sawtooth voltages from V12 and V13 are fed to the horizontal deflection plates of the cathode ray tube over leads L1 and L2 via condensers C38 and C34 respectively.

The positive square wave from the anode of V10 is fed also to the "blackout" valve V14 over condenser C35. This valve is so connected that a very square negative wave is produced across the anode resistance R65. This voltage is fed over lead L3 and condenser C42 to the cathode of the cathode ray tube (CRT) as a brightening voltage to illuminate the CRT screen only during the timebase trace. The time constants of the coupling circuit between the valve V14 and the CRT cathode are arranged to give uniform brightness of the timebase trace through its length.

*Split time base.*—For height finding the radar I. F. transmitter pulses and the corresponding received echoes are fed, alternately, through the upper and lower aerial lobes by means of an aerial switch system. From this aerial switch synchronisation for the splitting of the timebase is obtained. This is effected by arranging on the aerial switch a pair of contacts which "make" during the period when the lower aerial lobe is in use and "break" during the period when the upper aerial lobe is in use. Connection to these contacts may be made via a concentric cable brought into the display unit.

Because there is no definite relationship between the speed of switching from upper to lower aerial lobes when height finding and the PRF of the timebase it is necessary to arrange that the timebase is always "split" at the commencement of the trace irrespective of the fact that the changeover from lower to upper lobe may occur at any time during the interval between transmitter pulses.

The above requirement is achieved as follows. The speed of the timebase is controlled, among other things, by the positive potential to which the grid of the Miller timebase valve V12 is returned. The grid circuit of this valve includes resistances R55 and R101 and a potentiometer across the HT. This potentiometer comprises resistance R68 and pentode valve V15. When a split timebase is not required, or the lower aerial lobe is in use, the grid of V15 is earthed via split on/off switch S2 or aerial switch S1 and the valve acts as a resistance so that the potential at the anode remains constant. If a split timebase is required when the aerial switch changes over to the upper lobe, then the grid of potentiometer valve V15 is no longer earthed and the negative differential of the blackout square wave from the anode of valve V14 is applied to the grid, so that the potentiometer valve V15 is cut off for a short period at the commencement of the timebase trace. The period of cut off is determined by the constants of the differentiatory circuit C43, R67. The resistance R67 is made variable and thus controls the period during which valve V15 is cut off; with the constants chosen, the period can be varied over a range of from 2–40$\mu$ secs. approximately. When valve V15 is cut off, the anode potential and therefore the potential to which the grid of the Miller valve V12 is returned becomes more positive than when V15 is conducting. Thus the speed of the initial 2–40$\mu$ secs. of the timebase is greatly accelerated when a split timebase is required and this has the effect of shifting the whole timebase to the right. The amount of shift or "split" is controlled by R67 which may be conveniently identified as "split separation."

Calibration of the indicator may take any suitable form, a negative square wave of duration equal to the duration of the timebase and constituting the calibration control signal being applied over lead L4 via condenser C36 in the screen grid circuit of the "Transitron" connected valve V10.

It should be observed that components shown in the drawings, but not specifically referred to in this text, have their values included in the table of Figure 2, so as to complete the disclosure although their characteristic functions will be understood by those skilled in the art without further description. It may, however, be noted that the negative differential which is applied to the control grid of the potentiometer valve V15 may be taken direct from the screen grid circuit of the control valve V10 for the Miller valve V12, instead of from the "blackout" valve V14 as shown.

We claim:

1. A time base circuit for an oscilloscope, comprising a linear time base thermionic generator having a control grid, a variable voltage means, means connecting said control grid and said variable voltage means so that the operating level of said control grid is responsive to said voltage means, switch means connected to said voltage means for controlling the latter, and control means connected to said voltage means and arranged to provide changes in the said operating level only during time base sweeps.

2. The combination set forth in claim 1 wherein said variable voltage means comprises a thermionic valve having a control grid and wherein said switch means is connected to the last mentioned valve control grid for controlling the voltage of the latter.

3. A time base circuit for a cathode ray tube, comprising a linear time base thermionic generator including a valve having a cathode, an anode and a control grid, a power supply lead connected to said anode, a condenser connecting said anode and said grid, and means for intermittently cutting-off a flow of current through said valve from said anode to said cathode, in combination with a variable voltage means connecting said control grid to a positive source of potential, and means connected to said variable voltage means for varying the positive potential supplied to the control grid only at the commencement of a time base trace.

4. A time base circuit for a cathode ray tube, comprising a linear time base thermionic generator including a valve having a cathode, an anode and a control grid, a power supply lead connected to said anode, a condenser connecting said anode and said grid, and means for intermittently cutting-off a flow of current through said valve from said anode to said cathode, in combination with a variable voltage means connecting said control grid to a positive source of potential, means for controlling said variable voltage means to vary the positive potential supplied to the control grid only at the commencement of a time base trace, said variable voltage means comprising a thermionic valve having a plate and a control grid, means connecting said plate to the control grid of said linear time base generator valve, a power supply lead connected to said plate, a differentiating circuit for differentiating input pulses fed to said generator and connected to the control grid of said variable voltage means valve, switch means having two positions connected between said last-recited control grid and ground, one switch position connecting to ground and the second position disconnecting from ground, the last-recited valve being biased to conduct a steady current when the switch is in the one position and therefore act as a resistance having a potential drop thereacross the potential at the said plate being the said positive source of potential connected to the control grid of the linear time base generator valve the variable voltage value being removed from ground when the switch is in the second position so that a negative potential is applied to said last-recited control grid by said differentiating circuit at the instant of commencement of a time base trace causes the current through said last-recited valve to be cut off to apply an increased potential from said plate to the control grid of said generator valve, to produce a split sweep.

5. The combination set forth in claim 4 having an aerial change-over switch; and means synchronizing the actuation of said aerial change-over switch and said switch means.

6. The combination set forth in claim 4 having means for selectably varying the duration of the application of said negative potential to the control grid of said variable voltage means by said differentiating circuit.

7. The combination set forth in claim 6 wherein said duration varying means comprises a variable resistance in said differentiating circuit, said variable resistance connecting the control grid of said variable voltage means valve to said linear time base generator.

8. The combination set forth in claim 4 having a valve means connected to said differentiating circuit and responsive to the input pulses fed to said linear time base generator for feeding rectangular wave pulses to said differentiating circuit, and means for controlling said valve means to adjust the amplitude of said rectangular wave pulses whereby the brightness of the time base trace may be controlled.

9. The combination set forth in claim 4 wherein said means for connecting said plate to the control grid of said linear time base generator valve comprises a variable resistance for adjusting the amplitude of the potential applied to said last-recited control grid by said plate.

10. A time base circuit for a cathode ray tube comprising a saw tooth wave generating means including a valve having a control grid, a source of input pulses to be fed to said generating means, a switch means, and a variable voltage means connected to said grid and said switch means, and responsive to said input pulses for controlling the potential of said grid only at the commencement of a saw tooth cycle in response to the position of said switch means.

11. A time base circuit for a cathode ray tube, comprising a linear time base thermionic generator including a valve having a cathode, an anode and a control grid, a power supply lead connected to said anode, a condenser connecting said anode and said grid, and means for intermittently cutting-off a flow of current through said valve from said anode to said cathode, in combination with a variable voltage means connecting said control grid to a positive source of potential, means for controlling said variable voltage means to vary the positive potential supplied to the control grid only at the commencement of a time base trace, said variable voltage means comprising a thermionic valve having a plate and a control grid, means connecting said plate to the control grid of said linear time base generator valve, a differentiating circuit for differentiating input pulses fed to said generator and connected to the control grid of said variable voltage means valve, and a switch means connected between said last-recited control grid and ground, whereby in one position of the switch means the control grid of the variable voltage means valve is grounded and whereby in another position of said switch means the control grid of said variable voltage means valve is disconnected from ground.

12. A time base circuit for an oscilloscope comprising a linear time base thermionic generator comprising a control grid, means connected with the thermionic generator for triggering the latter to initiate time base sweeps, a variable voltage means, means connecting said control grid and said variable voltage means so that the operating level of said control grid is responsive to said voltage means, switch means connected to said voltage means for controlling the voltage means, and control means connected to said voltage means and also connected to the triggering means to provide changes in the said operating level only during time base sweeps.

GARFIELD LOUIS HINCKLEY.
JOHN H. W. SIMMONS.

REFERENCES CITED

The following references are of record in the file of this patent:

UNITED STATES PATENTS

| Number | Name | Date |
|---|---|---|
| 2,410,920 | Atwood | Nov. 12, 1946 |
| 2,412,064 | Moe | Dec. 3, 1946 |
| 2,412,485 | Whiteley | Dec. 10, 1946 |
| 2,430,292 | Hershberger | Nov. 4, 1947 |
| 2,432,101 | Shepherd | Dec. 9, 1947 |
| 2,444,338 | Dimond | June 29, 1948 |